United States Patent
Foschiano et al.

(10) Patent No.: US 7,434,254 B1
(45) Date of Patent: Oct. 7, 2008

(54) METHOD AND APPARATUS FOR AUTOMATIC FILTER GENERATION AND MAINTENANCE

(75) Inventors: Marco Foschiano, San Jose, CA (US); Christophe Paggen, San Jose, CA (US); Andrei Kouzmitch, Moscow (RU); Oleg Tabarovsky, Moscow (RU)

(73) Assignee: Cisco Technology, Inc., San Jose, CA (US)

( * ) Notice: Subject to any disclaimer, the term of this patent is extended or adjusted under 35 U.S.C. 154(b) by 897 days.

(21) Appl. No.: 10/280,773

(22) Filed: Oct. 25, 2002

(51) Int. Cl.
*G06F 15/16* (2006.01)

(52) U.S. Cl. .............................. 726/13; 726/11; 726/12; 726/14; 726/15; 713/153; 713/154

(58) Field of Classification Search ................. 709/227, 709/245, 236, 238, 221; 370/392; 726/2, 726/11–15; 713/153–154
See application file for complete search history.

(56) References Cited

U.S. PATENT DOCUMENTS

| | | | |
|---|---|---|---|
| 6,047,325 A * | 4/2000 | Jain et al. ................... 709/227 |
| 6,292,838 B1 * | 9/2001 | Nelson ........................ 709/236 |
| 6,650,642 B1 * | 11/2003 | Sugai et al. .................. 370/392 |
| 6,691,168 B1 * | 2/2004 | Bal et al. ..................... 709/238 |
| 7,007,080 B2 * | 2/2006 | Wilson ........................ 709/221 |
| 2002/0023174 A1 * | 2/2002 | Garrett et al. ................ 709/245 |

OTHER PUBLICATIONS

David C. Plummer, "An Ethernet Address Resolution Protocol—or—Converting Network Protocol Addresses to 48.bit Ethernet Address for Transmission on Ethernet Hardware," Nov. 1982, pp. 1-8.
S. Alexander, et al., "DHCP Options and BOOTP Vendor Extensions," Mar. 1997, pp. 1-32.
R. Droms, "Dynamic Host Configuration Protocol," Mar. 1997, pp. 1-43.

* cited by examiner

*Primary Examiner*—Kimyen Vu
*Assistant Examiner*—Baotran N To
(74) *Attorney, Agent, or Firm*—Hickman Palermo Truong & Becker LLP

(57) ABSTRACT

A method is disclosed for automatic filter generation and maintenance. From information transmitted on a network, a first device identifier and a second device identifier are detected. Based on the first and second device identifiers, a filter is automatically configured to deny network-transmitted information that attempts to establish an association between the first device identifier and a device identifier other than the second device identifier.

48 Claims, 7 Drawing Sheets

METHOD AND APPARATUS FOR AUTOMATIC FILTER GENERATION AND MAINTENANCE

FIELD OF THE INVENTION

The present invention generally relates to computer network security. The invention relates more specifically to a method and apparatus for automatic filter generation and maintenance.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

An address resolution protocol is used in a network to resolve associations between addresses of devices in a network. Historically, address resolution protocols have been used to resolve associations between Network Layer addresses and Data Link Layer addresses. For example, an address resolution protocol may be used to resolve an association between a given Internet Protocol (IP) address and a given Media Access Control (MAC) address. The IP address is a Network Layer address, while the MAC address is a Data Link Layer address.

One very popular address resolution protocol called Address Resolution Protocol (ARP) is defined in IETF Request for Comments (RFC) 826. Capitalization is used herein to distinguish the more specific ARP from the more general class of address resolution protocols of which ARP is a member. Another address resolution protocol is the EP Version 6 (IPv6) Neighbor Discovery Protocol.

In order to prevent a breach of network security that can result from misuse or abuse of an address resolution protocol, filters may be implemented. One such filter is an ARP filter. Upon receiving an ARP packet, which attempts to establish an association between an IP address and a MAC address that are included in the ARP packet, a network element (such as a switch or router) consults an ARP filter to determine if the association is permitted. If the association is permitted, then an ARP table, which is supposed to include only legitimate IP-MAC address bindings, is updated to include the permitted association. If the association is not permitted, then the ARP table is not updated.

While filters are effective in preventing some misuses or abuses of address resolution protocols, those seeking to implement filters have been required to generate and maintain the filters manually. As the number of network addresses in a network increases, manual maintenance of filters becomes less practical.

Furthermore, because some network addresses may be dynamically assigned and may change from time to time, filters that are not frequently updated may often contain outdated information that not only fails to prevent illegitimate address resolution, but also actively interferes with legitimate address resolution.

Based on the foregoing, there is a clear need for automatic filter generation and maintenance.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for automatic filter generation and maintenance is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method of Automatic Filter Generation and Maintenance
      3.1 Process of Inspecting Address Resolution Protocol Packets
      3.2 Process of Inspecting Dynamic Address Allocation Protocol Packets
      3.3 Process of Updating a Data Packet Filter
   4.0 Implementation Mechanisms-Hardware Overview
   5.0 Extensions and Alternatives

1.0 GENERAL OVERVIEW

The needs identified in the foregoing Background, and other needs and objects that will become apparent from the following description, are achieved in the present invention, which comprises, in one aspect, a method for automatic filter generation and maintenance. From information transmitted on a network, a first device identifier and a second device identifier are detected. Based on this detection, a filter is automatically configured to deny network-transmitted information that attempts to establish an association between the first device identifier and an identifier other than the second device identifier.

In other aspects, the invention encompasses a computer apparatus, and a computer readable medium, configured to carry out the foregoing steps.

2.0 STRUCTURAL AND FUNCTIONAL OVERVIEW

Figure 1:
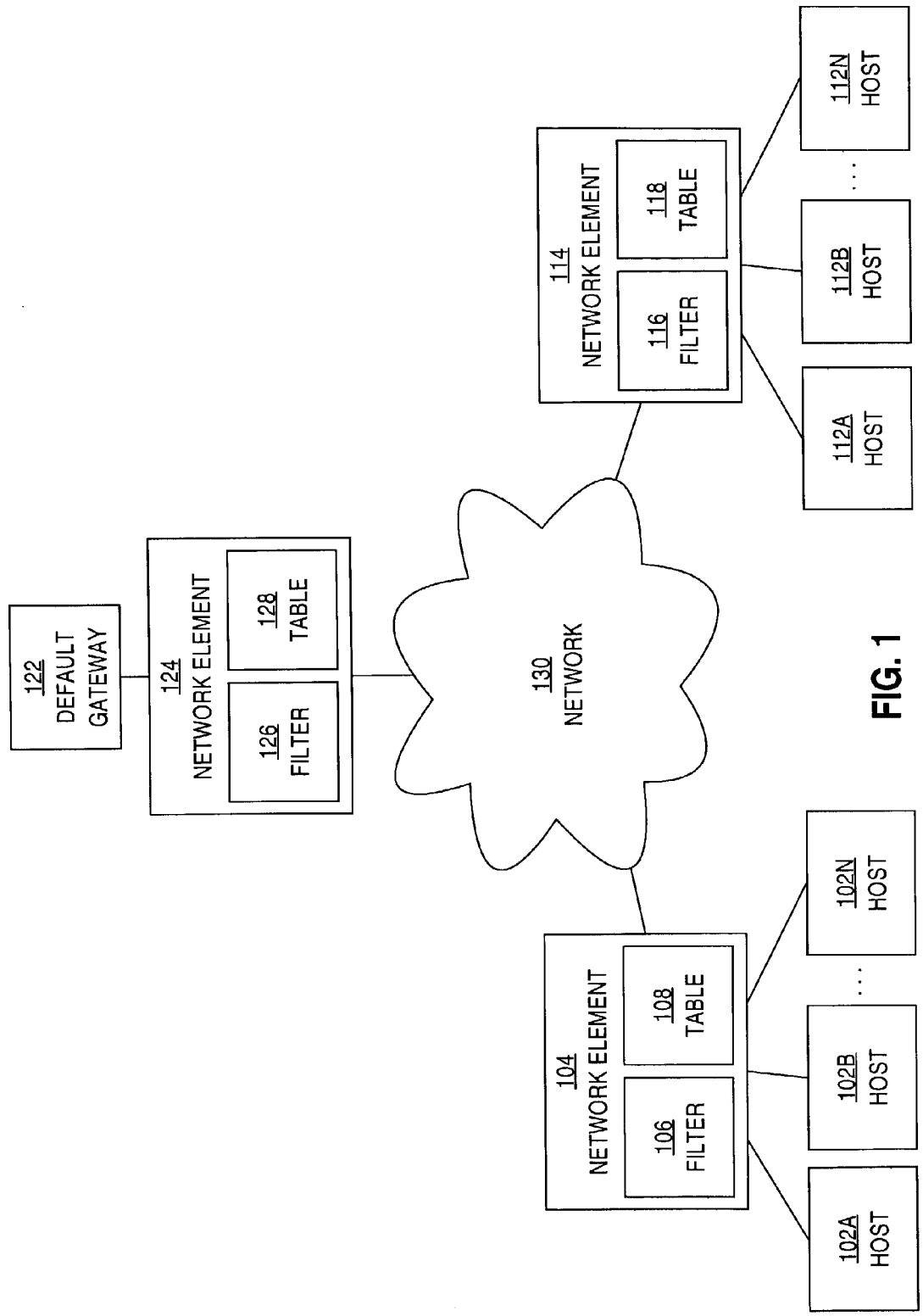
FIG. 1 is a block diagram that illustrates an overview of a system for automatic filter generation and maintenance.

FIG. 1 is a block diagram that illustrates an overview of a system for automatic filter generation and maintenance. The system includes hosts 102A-102N and 112A-112N; network elements 104, 114, and 124; a default gateway 122; and a network 130. Network elements 104, 114, and 124 include filters 106, 116, and 126, respectively. Network elements 104, 114, and 124 also include tables 108, 118, and 128, respectively. The system shown is just one of many possible different configurations. Other embodiments may include fewer or more system components than those illustrated.

Hosts 102A-102N are communicatively coupled to network element 104. Hosts 112A-112N are communicatively coupled to network element 114. Default gateway 122 is communicatively coupled to network element 124. Default gateway 122 may also be communicatively coupled to another network (not shown), which may be an untrusted network, such as the Internet. While default gateway 122 is shown communicatively coupled to network element 124, the default gateway could be communicatively coupled to network element 104 or network element 114 instead.

Network elements 104, 114, and 124 are communicatively coupled to network 130. System components may be communicatively coupled to various other system components through one or more ports that may be included in those components. While numerous system components are illustrated separately from network 130, from one perspective, all of the system components illustrated may be considered to comprise a network. Network 130 may include a local area network (LAN) or a wide area network (WAN).

Hosts 102A-102N and 112A-112N may include computers such as personal computers and workstations. Hosts 102A-102N and 112A-112N may also include network elements such as routers and switches. Each of hosts 102A-102N and 112A-112N may include a network interface device such as a network interface card. A network interface device is capable of transmitting data packets to and receiving data packets from a network.

Network elements 104, 114, and 124 may include network switches and routers. Network elements 104, 114, and 124 are configured to receive data packets, determine network addresses for which the data packets are destined, and forward the data packets to devices that are associated with the destined network addresses. Network elements 104, 114, and 124 may consult tables 108, 118, and 128, respectively, to determine the network addresses for which received data packets are destined.

Tables 108, 118, and 128 each store bindings that have been established between identifiers of devices that are communicatively coupled to network 130 (e.g., hosts 102A-102N, hosts 112A-112N, and default gateway 122). These identifiers uniquely establish identities of devices within a network, and may be used to address data packets. In one embodiment of the invention, tables 108, 118, and 128 store bindings between Data Link Layer addresses and Network Layer addresses for such devices. Each device may be associated with a unique binding between that device's Data Link Layer address and that device's Network Layer address. For example, tables 108, 118, and 128 may store bindings between IP addresses and MAC addresses of devices that are communicatively coupled to network elements 104, 114, and 124. Thus, a network element that determines an IP address from a received data packet may consult a table to determine a MAC address to which the IP address is bound, and then forward the data packet to a device that is associated with the MAC address. While tables 108, 118, and 128 are shown as being included within network elements 104, 114, and 124, respectively, these tables do not need to be included within any specific device.

In one embodiment, tables 108, 118, and 128 are ARP tables. In alternative embodiments, tables 108, 118, and 128 are tables that are configured to be compatible with an address resolution protocol other than ARP, such as IPv6 Neighbor Discovery Protocol.

Filters 106, 116, and 126 are capable of permitting or denying network-transmitted information, such as data packets, which attempt to establish a binding in tables 108, 118, and 124, respectively. Filters 106, 116, and 126 may include one or more rules that expressly permit or deny bindings between specific device identifiers. For example, filters 106, 116, and 125 may include one or more rules that expressly permit or deny bindings between certain IP addresses and certain MAC addresses. Thus, when a network element receives a network packet, such as an ARP packet, which attempts to establish a binding in a table, the network element may, based on the content of a filter, either permit or deny the establishment of the binding in the table. Filters 106, 116, and 126 may be configured to implicitly deny bindings that are not expressly permitted, or to implicitly permit bindings that are not expressly denied. The rules may include one or more ranges of device identifiers to which another specified device identifier either is or is not allowed to be bound.

In one embodiment, filters 106, 116, and 126 are syntactically constructed as access control lists, with each entry of a list corresponding to a rule. The rules may be ordered so that, depending on a position of a given rule in relation to other rules, the given rule takes precedence over, or is conditionally subject to, one or more of the other rules. In one embodiment, a rule takes the form of "action<P address><MAC address>", where "action" may be one of "permit" or "deny".

In one embodiment, rules that are included in filters 106, 116, and 126 may be associated with expiration indicators. An expiration indicator indicates a date and/or time after which the rule is no longer enforced by a network element. An expiration indicator may take the form of a specific date and time, or may take the form of a relative period of time from the time that the rule was established in the filter. In other words, a rule may be designated to expire, or "age out" after a specified amount of time has passed. Thus, in an environment in which network addresses are dynamically assigned and subject to frequent change, rules may be given a life span so that those rules do not interfere with the establishment of legitimate bindings in tables such as tables 108, 118, and 128.

In one embodiment, default gateway 122 is configured to detect, from information transmitted on network 130, a first device identifier and a second device identifier. Based on the detected information, default gateway 122 is configured to automatically configure filters 106, 116, and 126 to deny network-transmitted information that attempts to establish an association between the first device identifier and a device identifier other than the second device identifier.

Figure 2:
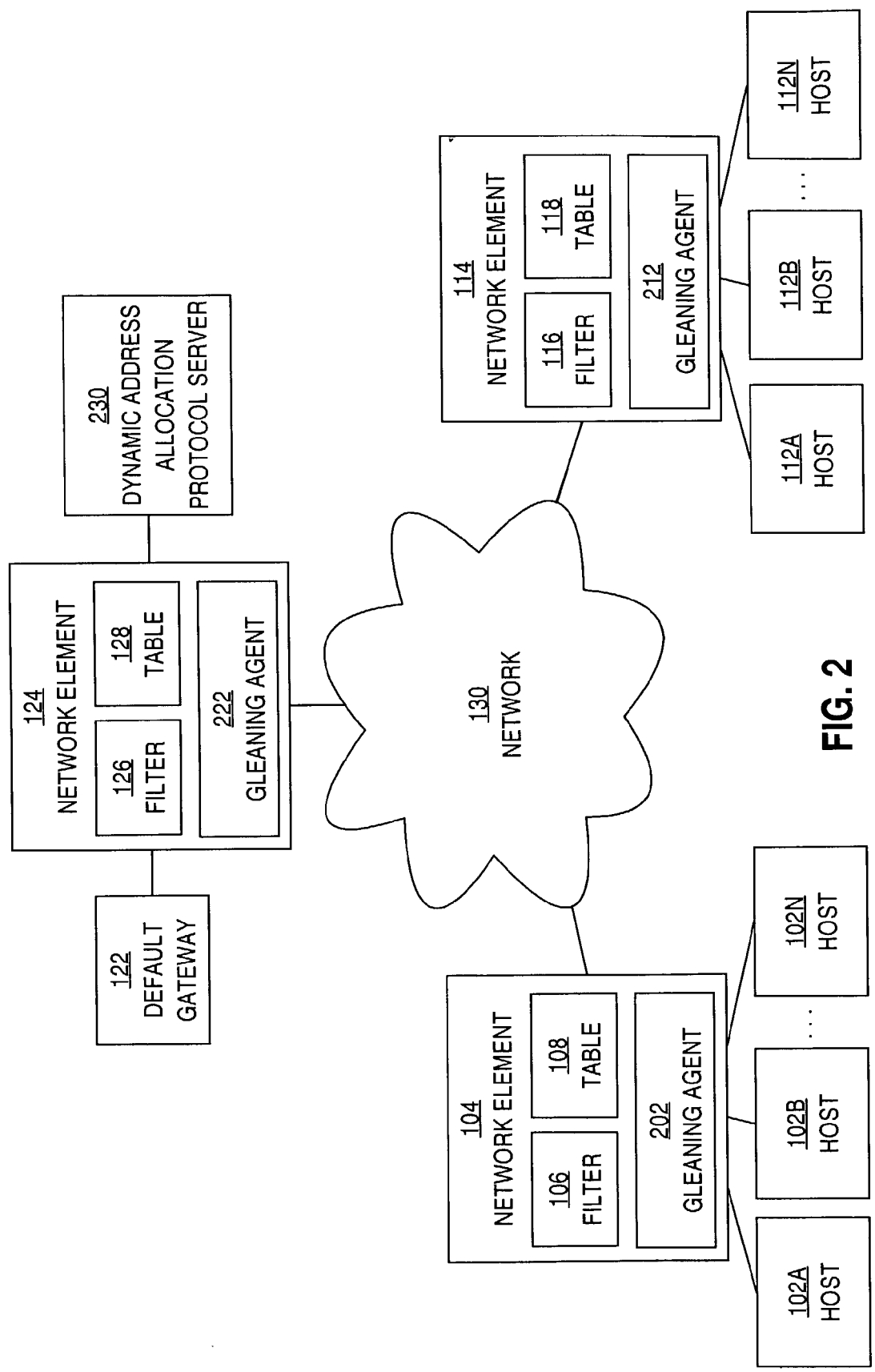
FIG. 2 is a block diagram that illustrates an overview of an enhanced system for automatic filter generation and maintenance.

FIG. 2 is a block diagram that illustrates an overview of an enhanced system for automatic filter generation and maintenance. The enhanced system includes a dynamic address allocation protocol server 230. While dynamic address allocation protocol server 230 is shown as communicatively coupled to network element 124, dynamic address allocation protocol server 230 could be communicatively coupled to network element 104 or network element 114 instead.

A dynamic address allocation protocol is a protocol that allocates network addresses to devices dynamically. Thus, a server such as dynamic address allocation protocol server 230 may use such a protocol to dynamically allocate network addresses to hosts 102A-102N and hosts 112A-112N. Dynamic allocation of network addresses frees a network administrator from the burden of manually and statically configuring each host.

One dynamic address allocation protocol is Dynamic Host Configuration Protocol (DHCP), as identified in IETF RFC 2121, 2132. Thus, in one embodiment, dynamic address allocation protocol server 230 is a DHCP server. While reference is made herein to an embodiment that uses DHCP, other embodiments may use different dynamic address allocation protocols to achieve a similar result.

In one embodiment, network elements 104, 114, and 124 include gleaning agents 202, 212, and 222, respectively. A gleaning agent is a mechanism that is configured to inspect network-transmitted information, such as network protocol packets, and glean, from that information, device identifiers such as IP addresses and MAC addresses. One such gleaning agent is a DHCP relay agent. A DHCP relay agent is configured to inspect DHCP packets, such as DHCP acknowledgement and release packets, and detect, from those DHCP packets, a trusted association between an IP address and a MAC address. In one embodiment, gleaning agents 202, 212, and 222 are DHCP relay agents.

In one embodiment, network elements 104, 114, and 124 are configured to detect, from information transmitted on network 130, a first device identifier and a second device identifier. Based on the detected information, network elements 104, 114, and 124 are configured to automatically configure filters 106, 116, and 126, respectively, to deny network-transmitted information that attempts to establish an association between the first device identifier and a device identifier other than the second device identifier.

Because filters 106, 116, and 126 are automatically updated, tables 108, 118, and 128 are protected from network protocol packets, such as ARP packets, that specify illegitimate bindings that would corrupt tables 108, 118, and 128. Thus, filters 106, 116, and 126 may be automatically and dynamically configured to prevent network address spoofing. The automatic configuration of these filters frees a network administrator from the burden of manually and statically configuring each filter.

3.0 METHOD OF AUTOMATIC FILTER GENERATION AND MAINTENANCE

Figure 3:
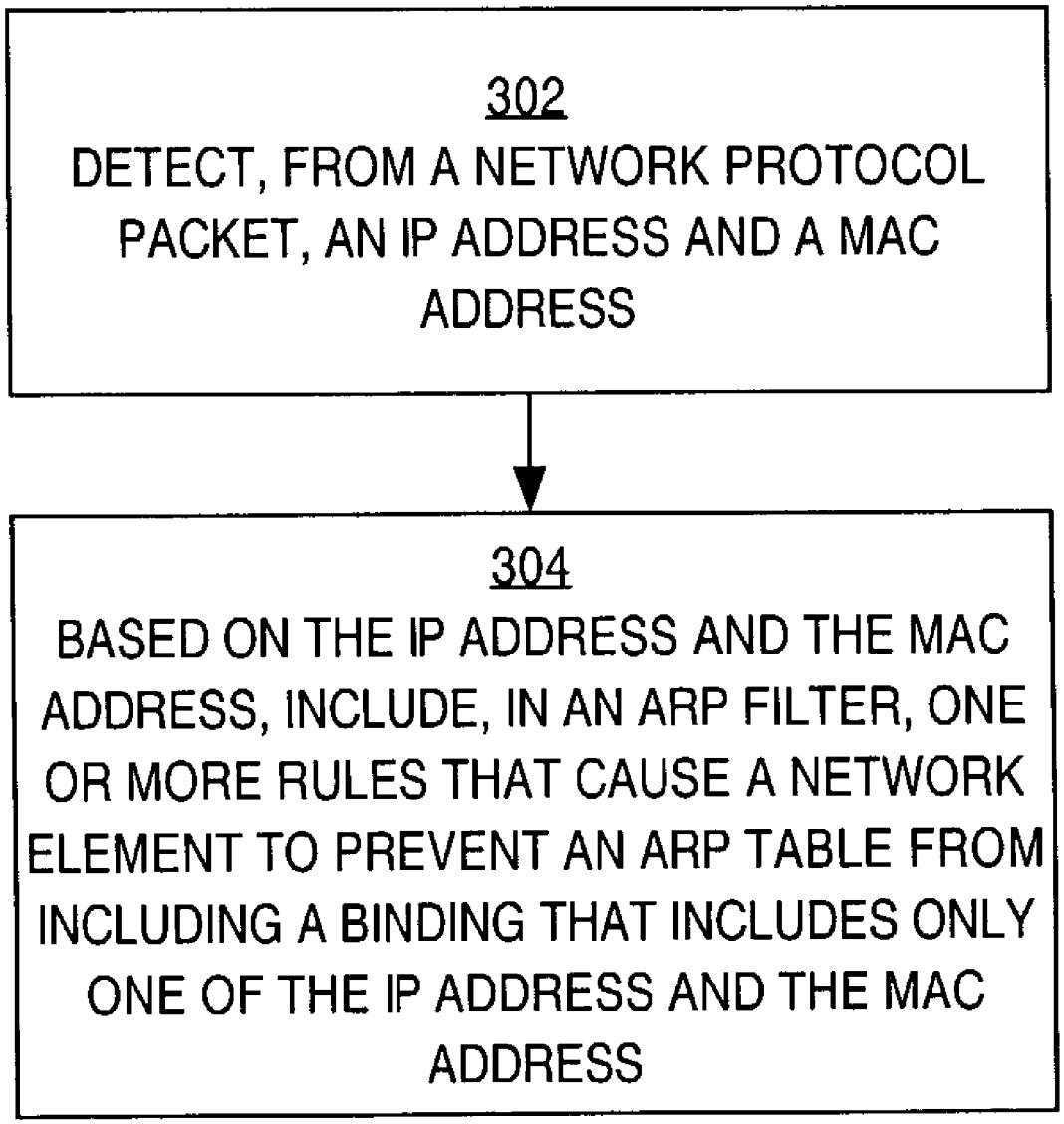
FIG. 3 is a flow diagram that illustrates a high level overview of one embodiment of a method for automatic filter generation and maintenance.

FIG. 3 is a flow diagram that illustrates a high level overview of one embodiment of a method for automatic filter generation and maintenance. In block 302, an IP address and a MAC address are detected from a network protocol packet. A network protocol packet is one kind of network packet. A network protocol packet is a network packet whose primary purpose is to transmit information that is used by a network protocol. For example, ARP packets and DHCP packets are network protocol packets. Some network packets are not network protocol packets.

For example, default gateway 122 may detect an IP address and a MAC address from an ARP packet that was received by the default gateway. For another example, one of network elements 104, 114, and 124 may detect an EP address and a MAC address from a DHCP packet that was received by that network element. Default gateway 122 does not need to inspect every network packet. It may be sufficient for default gateway 122 to inspect only certain kinds of network packets, such as network protocol packets.

In block 304, based on the IP address and the MAC address, one or more rules are created in an ARP filter. The one or more rules cause a network element to prevent an ARP table from including a binding that has only one of the IP address and the MAC address. In other words, the one or more rules prevent the ARP table from creating a binding in which the detected IP address is bound with a MAC address other than the detected MAC address, and the one or more rules prevent the ARP table from including a binding in which the detected MAC address is bound with an IP address other than the detected IP address.

For example, default gateway 122 may automatically update filters 106, 116, and 126 to include one or more rules that are based on the detected fP address and MAC address. For another example, one of network elements 104, 114, and 124 may automatically update one of filters 106, 116, and 126 to include one or more rules that are based on the detected IP address and MAC address.

3.1 PROCESS OF INSPECTING ADDRESS RESOLUTION PROTOCOL PACKETS

Figure 4:
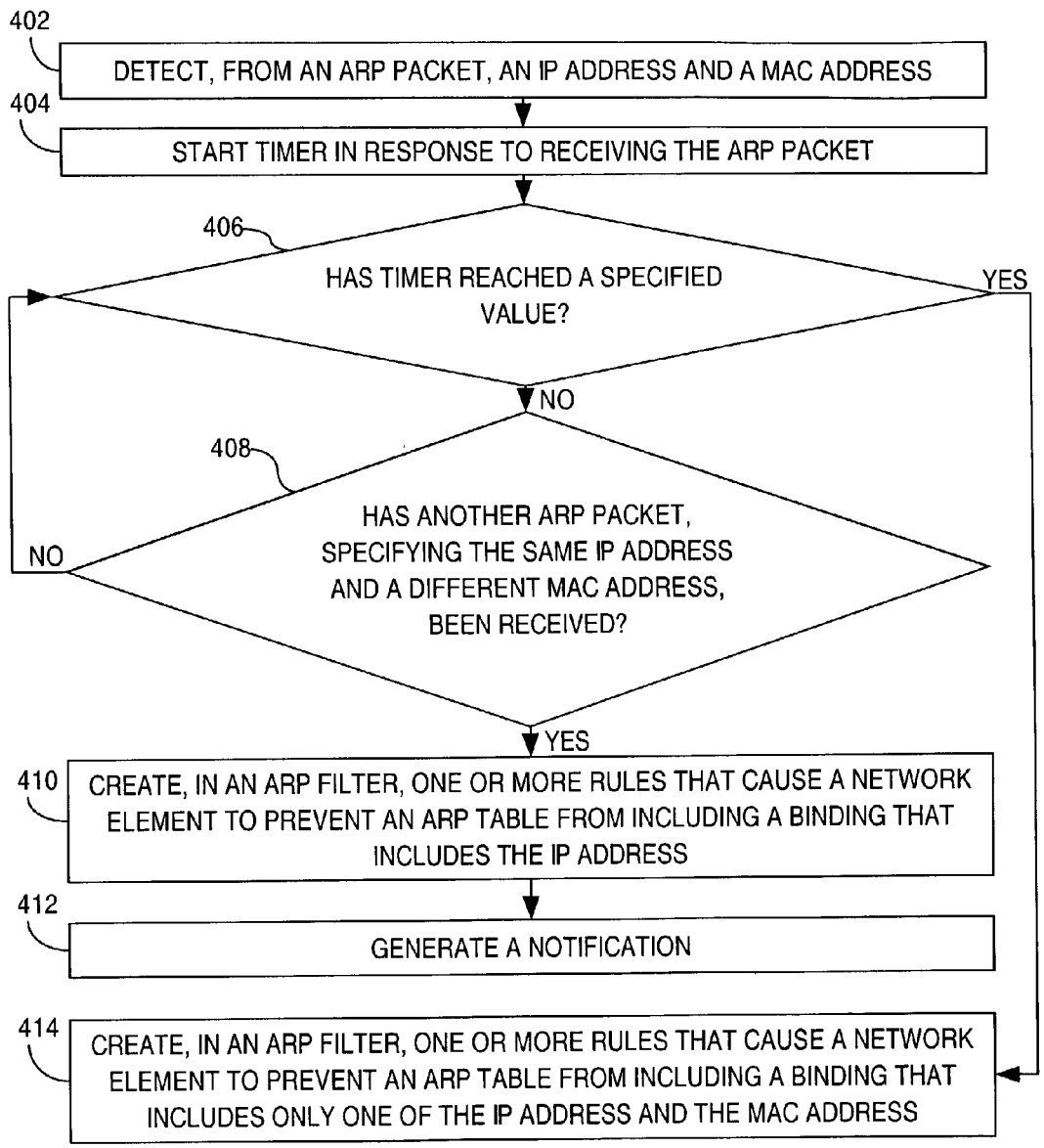
FIG. 4 is a flow diagram that illustrates one embodiment of a process for automatic filter generation and maintenance based on address resolution protocol packet inspection.

FIG. 4 is a flow diagram that illustrates one embodiment of a process for automatic filter generation and maintenance based on address resolution protocol packet inspection.

In block 402, an IP address and a MAC address are detected from an ARP packet. For example, default gateway 122 may receive an ARP packet (e.g., an ARP request or an ARP reply) and detect an IP address and a MAC address within the ARP packet. The ARP packet attempts to establish a binding, in an ARP table, between the IP address and the MAC address. However, default gateway 122 does not have enough information to determine whether the binding is legitimate.

In block 404, a timer is started in response to the receipt of the ARP packet. Referring to the example, default gateway 122 may start a software timer upon receiving the ARP packet. By starting the timer, default gateway 122 opens a "collision detection window" of time during which the default gateway inspects each received ARP packet as described below. Multiple collision detection windows may concurrently overlap.

In block 406, it is determined whether the timer has reached a specified value. A network administrator may specify the specified value as a configuration parameter. The specified value determines the duration of the collision detection window. If the timer has reached the specified value, then control passes to block 414. If the timer has not reached the specified value, then control passes to block 408.

In block 408, it is determined whether another ARP packet, which specifies the same IP address as the earlier-detected IP address, but which specifies a different MAC address than the earlier-detected MAC address, has been received. Referring to the example, default gateway 122 may, during the collision detection window, receive and inspect one or more other ARP packets. If an ARP packet has been received and that ARP packet duplicates the earlier-detected IP address but fails to duplicate the earlier-detected MAC address, then control passes to block 410. If such an ARP packet has not been received, then control passes to block 406.

In block 410, in response to the detection of at least two ARP packets that attempt to establish bindings of the same IP address to two different MAC addresses, one or more rules are included in an ARP filter. The one or more rules cause a network element to prevent an ARP table from including a binding that includes the IP address. Referring to the example, default gateway 122 may create in filter 126 (and possibly filters 106 and 116), in response to detecting an apparent IP-spoofing attempt, one or more rules that prevent table 128 (and possibly tables 108 and 118) from including a binding that includes the IP address. Because default gateway 122 does not have enough information to determine whether the earlier-received or the later-received ARP packet specifies an illegitimate binding, default gateway 122 ensures that neither MAC address may be bound to the IP address. Thus, the IP address is "blocked," or "locked out."

In block 412, a notification is generated. Referring to the example, default gateway 122 may generate a notification. The notification may include a message to a network administrator that indicates that two different ARP packets attempted to establish bindings of two different MAC addresses to the same IP address. Thus, a network administrator, upon viewing the notification, may investigate the matter and modify filters so that a legitimate binding between the IP address and one of the two MAC addresses may be established. The illegitimate binding may remain prohibited. Alternatively, the notification may comprise a programmatic message, publishing an event to an event bus, a log entry, etc.

In block 406, if the timer has reached the specified value and no "ARP collision" has been detected during the specified time period, then in block 414, one or more rules are created in an ARP filter. The one or more rules cause a network element to prevent an ARP table from including a binding that includes only one of the IP address and the MAC address. Because some doubt may remain as to whether the ARP packet did actually establish a legitimate binding, the one or more rules may be associated with an expiration indicator that will cause those rules to not be enforced after some specified period of time has passed. Referring to the example, default gateway 122 may include, in filter 126 (and possibly filters 106 and 116), one or more rules to prevent an established binding from being corrupted in table 128 (and possibly tables 108 and 118).

While the example above refers to default gateway 122 inspecting ARP packets and including rules in filters, in one embodiment, other devices may also inspect ARP packets and update filters in response.

3.2 PROCESS OF INSPECTING DYNAMIC ADDRESS ALLOCATION PROTOCOL PACKETS

Figure 5:
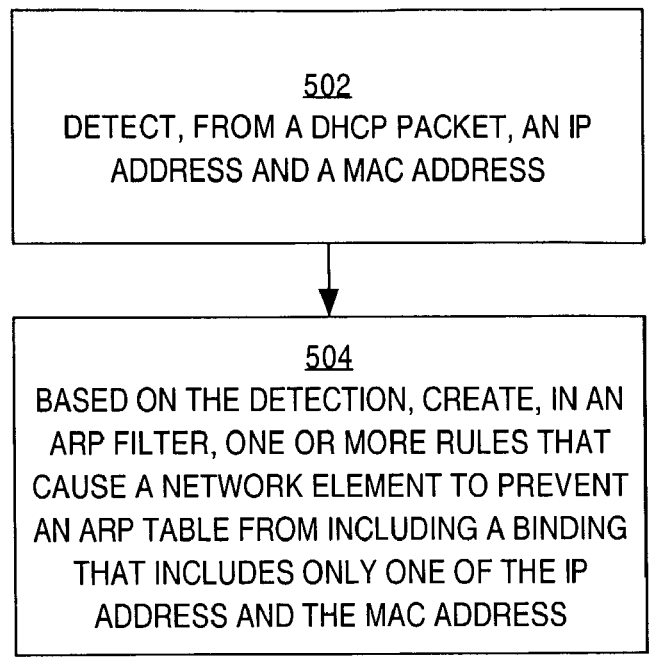
FIG. 5 is a flow diagram that illustrates one embodiment of a process for automatic filter generation and maintenance based on dynamic address allocation protocol packet inspection.

FIG. 5 is a flow diagram that illustrates one embodiment of a process for automatic filter generation and maintenance based on dynamic address allocation protocol packet inspection. In block 502, an IP address and a MAC address are detected from a DHCP packet (e.g., a DHCP acknowledgement packet). For example, one of network elements 104, 114, and 124 may detect an IP address and a MAC address from a DHCP packet that was received by that network element. A gleaning agent (e.g., a DHCP relay agent), such as gleaning agent 202, 212, or 222, relays DHCP acknowledgement packets to destined hosts. Therefore, the gleaning agent is capable of obtaining IP addresses and MAC addresses by inspecting DHCP acknowledgement packets. Addresses obtained from a DHCP packet are trusted.

In block 504, based on the detecting, one or more rules are included in an ARP filter. The one or more rules cause a network element to prevent an ARP table from including a binding that includes only one of the IP address and the MAC address. For example, one of network elements 104, 114, and 124 may automatically update one of filters 106, 116, and 126 to include one or more rules that are based on the detected IP address and MAC address.

Figure 6:
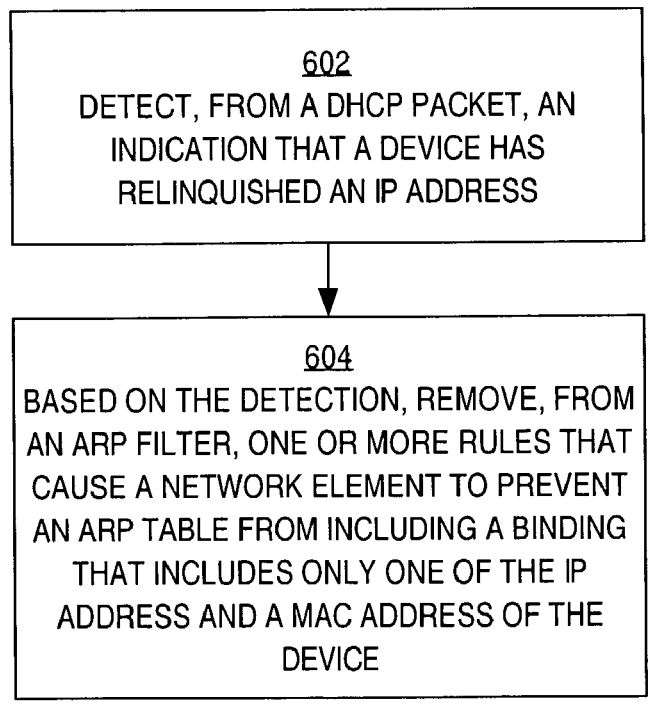
FIG. 6 is a flow diagram that illustrates one embodiment of a process for updating a filter based on DHCP release packet inspection.

According to one embodiment, DHCP packets may be inspected not only to prevent illegitimate bindings from being established, but also to allow network addresses that are included in expired bindings to be reassigned. FIG. 6 is a flow diagram that illustrates one embodiment of a process for updating a filter based on DHCP release packet inspection.

In block 602, an indication is detected, from a DHCP packet (e.g., a DHCP release packet), that a certain device has relinquished an IP address. For example, when a lease of an IP address to host 102A expires or is no longer needed, host 102A may unicast a DHCP release packet, which indicates that the IP address is relinquished, to dynamic address allocation protocol server 230 (e.g., a DHCP server). Network element 104 may glean the relinquished IP address from the unicasted DHCP release packet.

To enable this gleaning from a unicasted packet, network element 104 may include a network processor or ternary content-addressable memory (TCAM). For example, network element 104 may be a Cisco Catalyst 6000 Family Switch, a Cisco Catalyst 4000 Series Switch, or a Cisco Catalyst 3550 Series Switch.

In block 604, based on the detecting, one or more rules are removed from an ARP filter. The one or more rules cause a network element to prevent an ARP table from including a binding that includes only one of the IP address and a MAC address of the device that has relinquished the IP address. For example, one of network elements 104, 114, and 124 may automatically update one of filters 106, 116, and 126 to remove one or more rules that are based on the detected IP address and the MAC address of the device that has relinquished the IP address. By removing one or more rules that prevented a table from including certain bindings, the network element allows the table to include a binding between an IP address and MAC address that is different from the MAC address to which the IP address was formerly bound. Because the removal is automatic, a network administrator is freed from the burden of manually removing rules from filters.

Figure 7:
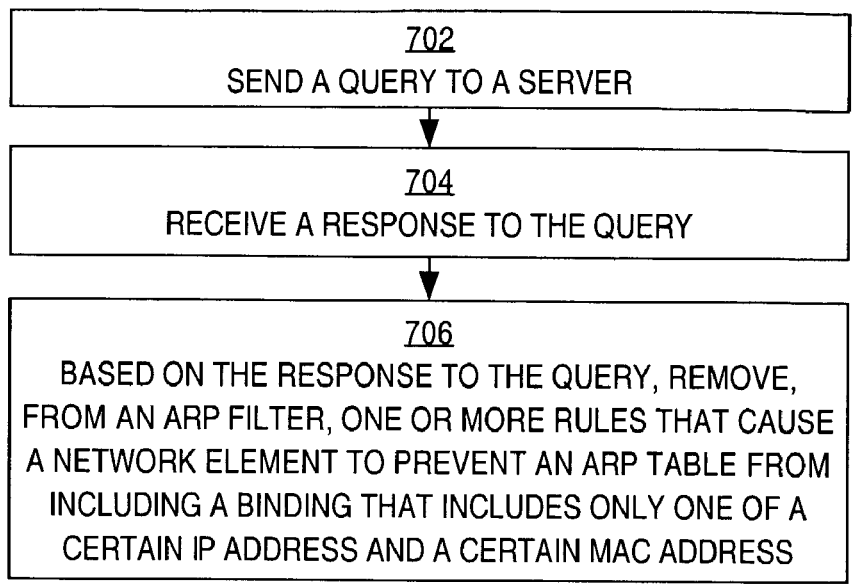
FIG. 7 is a flow diagram that illustrates one embodiment of a process for updating a filter based on a lease query protocol.

In one embodiment, even if a network element is incapable of gleaning information from a DHCP release that is unicasted to a DHCP server, the network element may still allow network addresses that are included in expired bindings to be reassigned. FIG. 7 is a flow diagram that illustrates one embodiment of a process for updating a filter based on a lease query protocol.

Like other embodiments, the embodiment illustrated in FIG. 7 is optional, and has particular application as a substitute filter maintenance technique when a network element is incapable of gleaning information from a DHCP release.

In block 702, a query is sent to a server. For example, network element 104 may send a DHCP lease query to dynamic address allocation protocol server 230 (e.g., a DHCP server).

In block 704, a response to the query is received. Referring to the example, network element 104 may receive a response to the DHCP lease query from dynamic address allocation protocol server 230. The response may include information that indicates when a lease of a certain IP address to a device that has a certain MAC address expires.

In block 706, based on the response to the query, one or more rules are removed from an ARP filter. The one or more rules cause a network element to prevent an ARP table from including a binding that includes only one of a certain IP address and a certain MAC address. For example, one of network elements 104, 114, and 124 may automatically remove, from one of filters 106, 116, and 126, one or more rules that cause the network element to prevent an ARP table from including a binding that includes only one of a certain IP address and a certain MAC address.

While the examples above make reference to DHCP, alternative embodiments may similarly use dynamic address allocation protocols other than DHCP.

In some embodiments, including embodiments in which a network element is capable of gleaning information from a DHCP release, a server may be queried in a manner similar to that described above in order to restore information that has been lost from a filter (e.g., due to a network switch being rebooted or replaced). To restore lost information, it is sufficient for the server to be queried just once. After the information is obtained from the server, the server does not need to be queried again for that purpose.

According to one embodiment, a mechanism, such as a non-volatile memory that is accessible by a communication protocol, provides storage and retrieval of state information that is maintained by a gleaning agent. The mechanism may be, for example, a hard disk that is accessible through the File Transfer Protocol (FTP), or a DHCP database (maintained by a DHCP server) that is accessible through the DHCP lease query protocol.

3.3 PROCESS OF UPDATING A DATA PACKET FILTER

Figure 8:
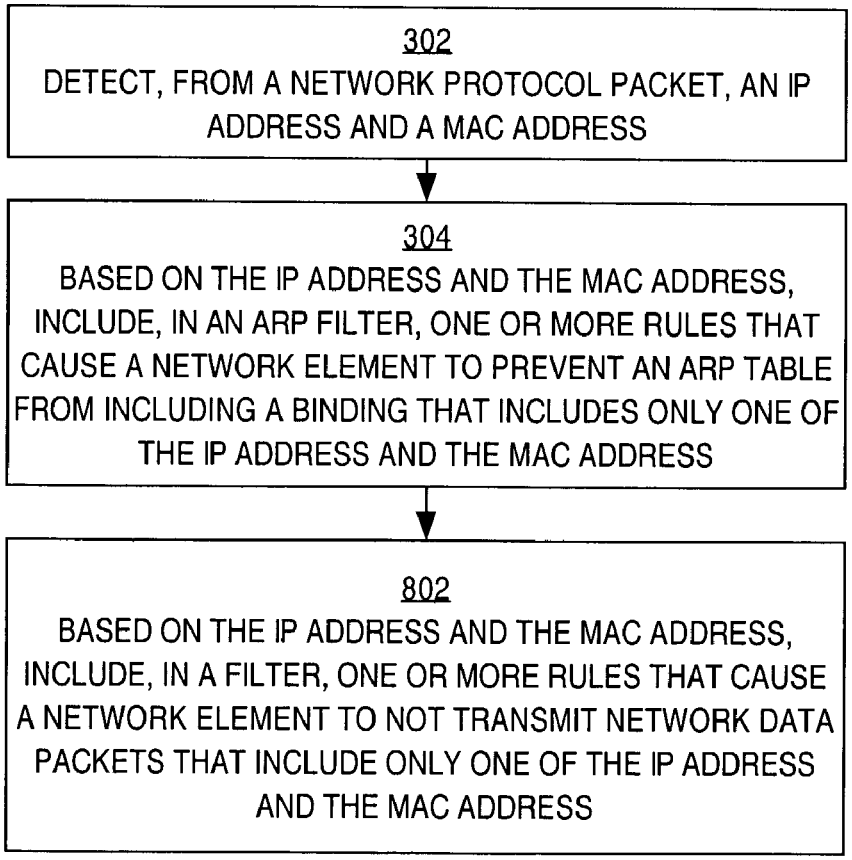
FIG. 8 is a flow diagram that illustrates one embodiment of a process for updating a data packet filter based on protocol packet inspection.

As described above, address resolution protocol filters, such as ARP filters, may be automatically updated to prevent tables, such as ARP tables, from being corrupted. As a result, network address spoofing is prevented. Additionally, other network packets, besides network protocol packets such as ARP packets and DHCP packets, may be inspected to prevent unauthorized network traffic. FIG. 8 is a flow diagram that illustrates one embodiment of a process for updating a data packet filter based on protocol packet inspection.

As in FIG. 3, in block 302 of FIG. 8, an IP address and a MAC address are detected from a network protocol packet. In block 304, based on the IP address and the MAC address, one or more rules are created in an ARP filter. In block 802, based on the IP address and the MAC address, one or more rules are included in a filter. The filter may be a different filter than the ARP filter. For example, the filter may be an IP filter. The rules included in the filter prevent a network element from transmitting network data packets that include only one of the IP address and the MAC address. In other words, the one or more rules prevent the network element from transmitting a network data packet if that network data packet includes a source IP address and source MAC address pair that differs from an IP address and MAC address pair that are specified by the filter.

For example, one of network elements 104, 114, and 124 may automatically update a network data packet filter to include one or more rules that are based on the detected IP address and MAC address. Whenever the network element receives a network data packet, such as an IP packet, the network element may evaluate the network addresses specified by the network data packet against the rules included in the network data packet filter. If the network addresses are in agreement with the rules, then the network element may transmit the network data packet. If the network addresses are in conflict with the rules, then the network element may drop the network data packet. Thus, illegitimate network traffic may be automatically reduced.

One or more of the rules may include a scope of enforcement indicator. Thus, a rule may be made to apply globally, or a rule may be made to apply only in relation to a specified port of a network element or other device.

4.0 IMPLEMENTATION MECHANISMS—HARDWARE OVERVIEW

Figure 9:
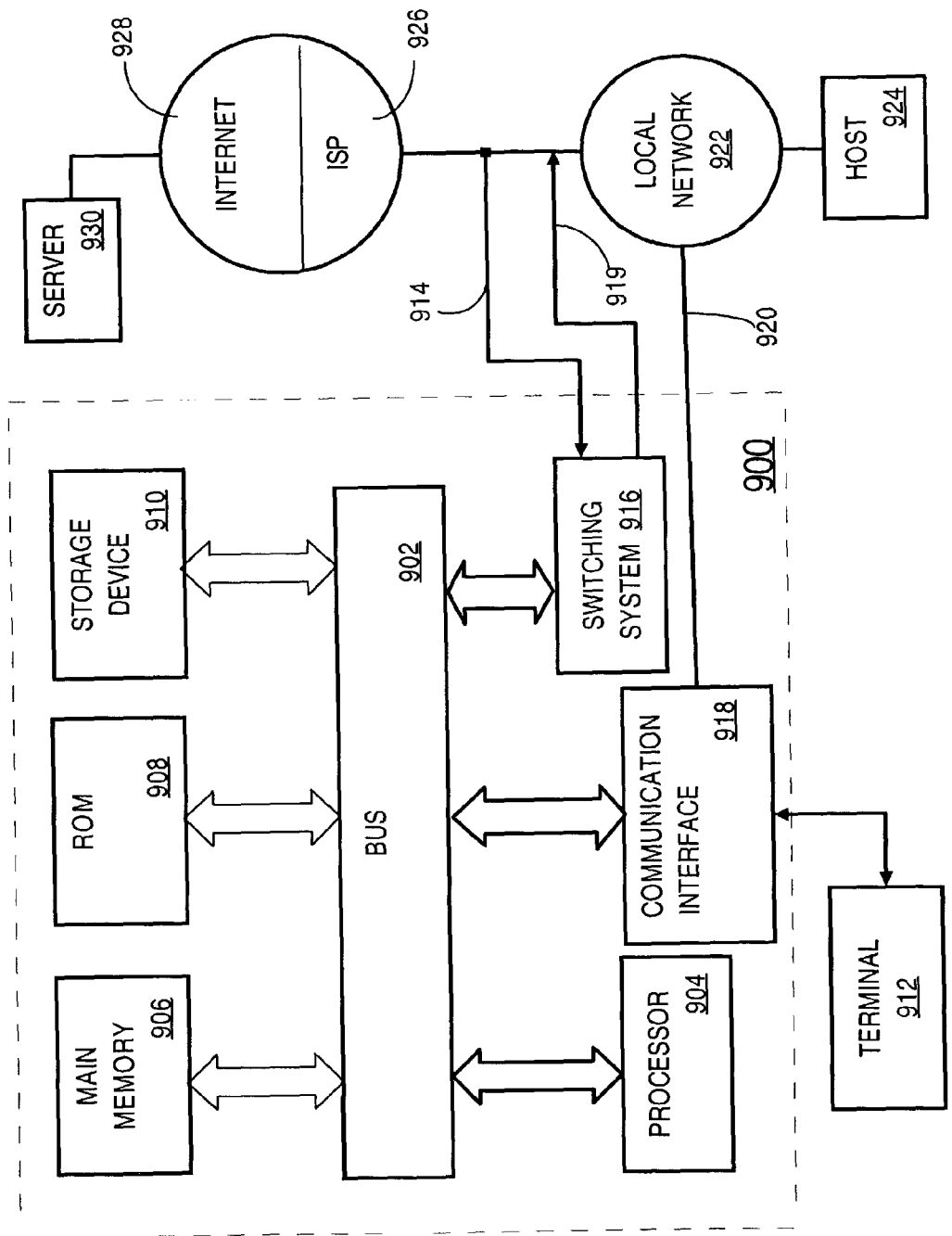
FIG. 9 is a block diagram that illustrates a computer system upon which an embodiment may be implemented.

FIG. 9 is a block diagram that illustrates a computer system 900 upon which an embodiment may be implemented. The preferred embodiment is implemented using one or more computer programs running on a network element such as a router device. Thus, in this embodiment, the computer system 900 is a router.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

An communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 914. Firmware or software running in the computer system 900 provides a terminal interface or character-based command interface so that external commands can be given to the computer system.

A switching system 916 is coupled to bus 902 and has an input interface 914 and an output interface 919 to one or more external network elements. The external network elements may include a local network 922 coupled to one or more hosts 924, or a global network such as Internet 928 having one or more servers 930. The switching system 916 switches information traffic arriving on input interface 914 to output interface 919 according to pre-determined protocols and conventions that are well known. For example, switching system 916, in cooperation with processor 904, can determine a destination of a packet of data arriving on input interface 914 and send it to the correct destination using output interface 919. The destinations may include host 924, server 930, other end stations, or other routing and switching devices in local network 922 or Internet 928.

The invention is related to the use of computer system 900 for automatic filter generation and maintenance. According to one embodiment, automatic filter generation and maintenance is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Communication interface 918 also provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for automatic filter generation and maintenance as described herein.

The received code may be executed by processor 904 as it is received, and/or stored in storage device 910, or other non-volatile storage for later execution. In this manner, computer system 900 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope. The specification and drawings are, accordingly, to be regarded in an illustrative rather than a restrictive sense.

For example, the processes described above may, in various embodiments, incorporate mechanisms that enable the authentication of network traffic. Specifically, DHCP Option 82 may be used to authenticate DHCP packets.

What is claimed is:

1. A method for automatic filter generation and maintenance, the method comprising the computer-implemented steps of:
    detecting, at a first network element, from a network packet, an Internet Protocol (IP) address and a first Media Access Control (MAC) address;
    wherein the IP address and the first MAC address are used by the first network element as a basis to determine that the IP address and another MAC address that are detected from another network packet is an illegal binding and wherein said another MAC address is different from the first MAC address;
    causing a second network element to, based on the IP address and the first MAC address, create, in an Address Resolution Protocol (ARP) filter, one or more rules that cause the second network element to prevent an ARP table from including a binding that includes only one of the IP address and the first MAC address;
    wherein the second network element is different from the first network element; and
    in response to detecting, at the first network element, from said another network packet, the IP address and said another MAC address, preventing the ARP table from including the illegal binding that includes the IP address and said another MAC address.

2. The method as recited in claim 1, wherein the network packet is a Dynamic Host Configuration Protocol (DHCP) packet.

3. The method as recited in claim 1, further comprising the computer-implemented steps of:
    detecting, from a second network packet, an indication that a second IP address is relinquished by a device that has a second MAC address; and
    causing the second network element to, based on detecting the second network packet, remove, from an ARP filter, one or more rules that cause the second network element to prevent an ARP table from including a binding that includes only one of the second IP address and the second MAC address.

4. The method as recited in claim 1, further comprising the computer-implemented steps of:
sending a query to a server;
receiving a response to the query; and
causing the second network element to, based on the response to the query, remove, from an ARP filter, one or more rules that cause the second network element to prevent an ARP table from including a binding that includes only one of the second IP address and the second MAC address.

5. The method as recited in claim 1, wherein the network packet is an ARP packet.

6. The method as recited in claim 1, wherein the network packet is an ARP packet, the method further comprising the computer-implemented steps of:
detecting, within a specified period of time after detecting the IP address from the ARP packet, a second ARP packet that specifies the IP address and a second MAC address that differs from the first MAC address; and
in response to detecting the second ARP packet, causing the second network element to create, in an ARP filter, one or more rules that cause a network element to prevent an ARP table from including a binding that includes the IP address.

7. The method as recited in claim 1, wherein the network packet is an ARP packet, the method further comprising the computer-implemented steps of:
detecting, within a specified period of time after detecting the IP address from the ARP packet, a second ARP packet that specifies the IP address and a second MAC address that differs from the first MAC address; and
in response to detecting the second ARP packet, generating a notification.

8. The method as recited in claim 1, wherein the network packet is an ARP packet, the method further comprising the computer-implemented steps of:
inspecting one or more other ARP packets that are received within a specified period of time after detecting the IP address from the ARP packet; and
upon determining that none of the one or more other ARP packets specifies the IP address and a second MAC address that differs from the first MAC address, causing the second network element to include, in an ARP filter, one or more rules that cause a network element to prevent an ARP table from including a binding that includes only one of the IP address and the first MAC address.

9. The method as recited in claim 1, wherein the one or more rules are associated with an expiration indicator.

10. The method as recited in claim 1, wherein the one or more rules are ordered in the ARP filter to be precedent over another rule in the ARP filter.

11. The method as recited in claim 1, wherein the one or more rules are ordered in the ARP filter to be conditional subsequent to another rule in the ARP filter.

12. The method as recited in claim 1, wherein the one or more rules include one or more ranges of addresses.

13. The method as recited in claim 1, further comprising the computer-implemented step of:
based on the detecting, including, in a filter, one or more rules that cause a network element to not transmit network packets that include only one of the IP address and the first MAC address.

14. The method as recited in claim 1, wherein the ARP filter denies, by default, any bindings that are not expressly permitted by one or more rules.

15. The method as recited in claim 1, wherein the ARP filter permits, by default, any bindings that are not expressly denied by one or more rules.

16. A computer-readable storage medium storing one or more sequences of instructions for automatic filter generation and maintenance, which instructions, when executed by one or more processors, cause the one or more processors to carry out the steps of:
detecting, at a first network element, from a network packet, an Internet Protocol (IP) address and a first Media Access Control (MAC) address;
wherein the IP address and the first MAC address are used by the first network element as a basis to determine that the IP address and another MAC address that are detected from another network packet is an illegal binding and wherein said another MAC address is different from the first MAC address;
causing a second network element to, based on the IP address and the first MAC address, create, in an Address Resolution Protocol (ARP) filter, one or more rules that cause the second network element to prevent an ARP table from including a binding that includes only one of the IP address and the first MAC address;
wherein the second network element is different from the first network element; and
in response to detecting, at the first network element, from said another network packet, the IP address and said another MAC address, preventing the ARP table from including the illegal binding that includes the IP address and said another MAC address.

17. An apparatus for automatic filter generation and maintenance, comprising:
means for detecting, at a first element, from a network packet, an Internet Protocol (IP) address and a first Media Access Control (MAC) address;
wherein the IP address and the first MAC address are used by the first network element as a basis to determine that the IP address and another MAC address that are detected from another network packet is an illegal binding and wherein said another MAC address is different from the first MAC address;
means for causing a second network element to, based on the IP address and the first MAC address, create, in an Address Resolution Protocol (ARP) filter, one or more rules that cause the second network element to prevent an ARP table from including a binding that includes only one of the IP address and the first MAC address;
wherein the second network element is different from the first network element; and
means for preventing, in response to detecting, at the first network element, from said another network packet, the IP address and said another MAC address, the ARP table from including the illegal binding that includes the IP address and said another MAC address.

18. An apparatus for automatic filter generation and maintenance, comprising:
a network interface that is coupled to a data network for receiving one or more packet flows therefrom;
a processor; and one or more stored sequences of instructions which, when executed by the processor, cause the processor to carry out the steps of:
detecting, at a first network element, from a network packet, an Internet Protocol (IP) address and a first Media Access Control (MAC) address;

wherein the IP address and the first MAC address are used by the first network element as a basis to determine that the IP address and another MAC address that are detected from another network packet is an illegal binding and wherein said another MAC address is different from the first MAC address;

causing a second network element to, based on the IP address and the first MAC address, create, in an Address Resolution Protocol (ARP) filter, one or more rules that cause the second network element to prevent an ARP table from including a binding that includes only one of the IP address and the first MAC address;

wherein the second network element is different from the first network element; and in response to detecting, at the first network element, from said another network packet, the IP address and said another MAC address, preventing the ARP table from including the illegal binding that includes the IP address and said another MAC address.

19. A method for automatic filter generation and maintenance, the method comprising the computer-implemented steps of:

detecting, at a first network element, from information transmitted on a network, a first device identifier and a second device identifier;

wherein the first device identifier and the second device identifier are used by the first network element as a basis to determine that the first device identifier and another device identifier that are detected from different information transmitted on the network are an illegal binding and wherein said another device identifier is different from the second device identifier;

causing a second network element to, based on the first device identifier and the second device identifier, automatically configure a filter to deny network-transmitted information that attempts to establish an association between the first device identifier and a third device identifier that is different than the second device identifier;

wherein the second network element is different from the first network element; and in response to detecting, at the first network element, from the different information transmitted on the network, the first device identifier and said another device identifier, preventing the illegal binding between the first device identifier and said another device identifier.

20. A method for automatic filter generation and maintenance, the method comprising the computer-implemented steps of:

detecting, at a first network element, from a network packet, a Network Layer address and a Data Link Layer address;

wherein the Network Layer address and the Data Link Layer address are used by the first network element as a basis to determine that the Network Layer address and another Data Link Layer address that are detected from another network packet are an illegal association and wherein said another Data Link Layer address is different from the Data Link Layer address;

causing a second network element to, based on the Network Layer address and the Data Link Layer address, automatically update a filter that the second network element consults to determine whether to permit a particular network packet that attempts to establish an association between a Network Layer address and a Data Link Layer address;

wherein the second network element is different from the first network element; and in response to detecting, at the first network element, from said another network packet, the Network Layer address and said another Data Link Layer address, preventing the illegal association between the Network Layer address and said another Data Link Layer address.

21. The apparatus as recited in claim 18, wherein the network packet is a Dynamic Host Configuration Protocol (DHCP) packet.

22. The apparatus as recited in claim 18, the one or more stored sequences of instructions further comprising instructions which, when executed by the processor, cause the processor to carry out the steps of:

detecting, from a second network packet, an indication that a second IP address is relinquished by a device that has a second MAC address; and causing the second network element to, based on detecting the second network packet, remove, from an ARP filter, one or more rules that cause the second network element to prevent an ARP table from including a binding that includes only one of the second IP address and the second MAC address.

23. The apparatus as recited in claim 18, the one or more stored sequences of instructions further comprising instructions which, when executed by the processor, cause the processor to carry out the steps of:

sending a query to a server;

receiving a response to the query; and causing the second network element to, based on the response to the query, remove, from an ARP filter, one or more rules that cause the second network element to prevent an ARP table from including a binding that includes only one of the second IP address and the second MAC address.

24. The apparatus as recited in claim 18, wherein the network packet is an ARP packet.

25. The apparatus as recited in claim 18, wherein the network packet is an ARP packet, the one or more stored sequences of instructions further comprising instructions which, when executed by the processor, cause the processor to carry out the steps of:

detecting, within a specified period of time after detecting the IP address from the ARP packet, a second ARP packet that specifies the IP address and a second MAC address that differs from the first MAC address; and in response to detecting the second ARP packet, causing the second network element to create, in an ARP filter, one or more rules that cause the second network element to prevent an ARP table from including a binding that includes the IP address.

26. The apparatus as recited in claim 18, wherein the network packet is an ARP packet, the one or more stored sequences of instructions further comprising instructions which, when executed by the processor, cause the processor to carry out the steps of:

detecting, within a specified period of time after detecting the IP address from the ARP packet, a second ARP packet that specifies the IP address and a second MAC address that differs from the first MAC address; and in response to detecting the second ARP packet, generating a notification.

27. The apparatus as recited in claim 18, wherein the network packet is an ARP packet, the one or more stored sequences of instructions further comprising instructions which, when executed by the processor, cause the processor to carry out the steps of:

inspecting one or more other ARP packets that are received within a specified period of time after detecting the IP address from the ARP packet; and upon determining that none of the one or more other ARP packets specifies the IP address and a second MAC address that differs from the first MAC address, causing the second network element to include, in an ARP filter, one or more rules that cause the second network element to prevent an ARP table from including a binding that includes only one of the IP address and the first MAC address.

28. The apparatus as recited in claim 18, wherein the one or more rules are associated with an expiration indicator.

29. The apparatus as recited in claim 18, wherein the one or more rules are ordered in the ARP filter to be precedent over another rule in the ARP filter.

30. The apparatus as recited in claim 18, wherein the one or more rules are ordered in the ARP filter to be conditional subsequent to another rule in the ARP filter.

31. The apparatus as recited in claim 18, wherein the one or more rules include one or more ranges of addresses.

32. The apparatus as recited in claim 18, the one or more stored sequences of instructions further comprising instructions which, when executed by the processor, cause the processor to carry out the steps of:

based on the detecting, including, in a filter, one or more rules that cause a network element to not transmit network packets that include only one of the IP address and the first MAC address.

33. The apparatus as recited in claim 18, wherein the ARP filter denies, by default, any bindings that are not expressly permitted by one or more rules.

34. The apparatus as recited in claim 18, wherein the ARP filter permits, by default, any bindings that are not expressly denied by one or more rules.

35. The apparatus as recited in claim 17, wherein the network packet is a Dynamic Host Configuration Protocol (DHCP) packet.

36. The apparatus as recited in claim 17, further comprising:

means for detecting, from a second network packet, an indication that a second IP address is relinquished by a device that has a second MAC address; and means for causing the second network element to, based on detecting the second network packet, remove, from an ARP filter, one or more rules that cause the second network element to prevent an ARP tables from including a binding that includes only one of the second IP address and the second MAC address.

37. The apparatus as recited in claim 17, further comprising:

means for sending a query to a server;

means for receiving a response to the query; and means for causing the second network element to, based on the response to the query, remove, from an ARP filter, one or more rules that cause the second network element to prevent an ARP table from including a binding that includes only one of the second IP address and the second MAC address.

38. The apparatus as recited in claim 17, wherein the network packet is an ARP packet.

39. The apparatus as recited in claim 17, wherein the network packet is an ARP packet, the apparatus further comprising:

means for detecting, within a specified period of time after detecting the IP address from the ARP packet, a second ARP packet that specifies the IP address and a second MAC address that differs from the first MAC address; and means for causing, in response to detecting the second ARP packet, the second network element to create, in the one or more ARP filters, one or more rules that cause the second network element to prevent an ARP table from including a binding that includes the IP address.

40. The apparatus as recited in claim 17, wherein the network packet is an ARP packet, the apparatus further comprising:

means for detecting, within a specified period of time after detecting the IP address from the ARP packet, a second ARP packet that specifies the IP address and a second MAC address that differs from the first MAC address; and means for generating, in response to detecting the second ARP packet, a notification.

41. The apparatus as recited in claim 17, wherein the network packet is an ARP packet, the apparatus further comprising:

means for inspecting one or more other ARP packets that are received within a specified period of time after detecting the IP address from the ARP packet; and means for causing, upon determining that none of the one or more other ARP packets specifies the IP address and a second MAC address that differs from the first MAC address, the second network element to include, in an ARP filter, one or more rules that cause the second network element to prevent an ARP table from including a binding that includes only one of the IP address and the first MAC address.

42. The apparatus as recited in claim 17, wherein the one or more rules are associated with an expiration indicator.

43. The apparatus as recited in claim 17, wherein the one or more rules are ordered in the ARP filter to be precedent over another rule in the ARP filter.

44. The apparatus as recited in claim 17, wherein the one or more rules are ordered in the ARP filter to be conditional subsequent to another rule in the ARP filter.

45. The apparatus as recited in claim 17, wherein the one or more rules include one or more ranges of addresses.

46. The apparatus as recited in claim 17, further comprising:

means for including, based on the detecting, in a filter, one or more rules that cause a network element to not transmit network packets that include only one of the IP address and the first MAC address.

47. The apparatus as recited in claim 17, wherein the ARP filter denies, by default, any bindings that are not expressly permitted by one or more rules.

48. The apparatus as recited in claim 17, wherein the ARP filter permits, by default, any bindings that are not expressly denied by one or more rules.

* * * * *